3,388,525
METHOD AND APPARATUS FOR FORMING
AND SEALING A CONTAINER
Georg Thesing, Dortmund-Schonau, and Heinrich Risse, Dortmund-Brechten, Germany, assignors to Holstein & Kappert, Maschinenfabrik Phonix G.m.b.H., Dortmund, Germany
Filed Mar. 1, 1966, Ser. No. 530,999
Claims priority, application Germany, Apr. 2, 1965, H 55,686
32 Claims. (Cl. 53—39)

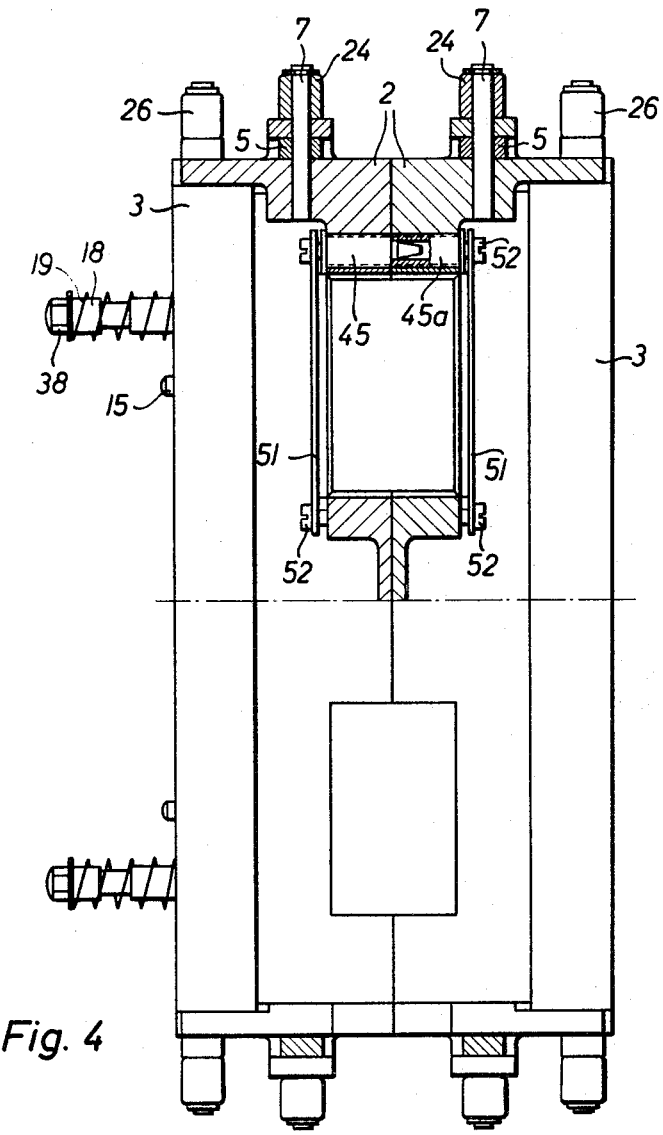

This invention relates in general to container-forming and sealing apparatus and a method of forming and sealing a container, and in particular to a new and useful device for forming individual container elements of substantially exact parallelepiped form from a rectangular tube filled with a material such as a liquid, and for sealing the individual container elements at the tops and bottoms and for severing them from the tube, and to a method of forming the individual container elements from the tube and for sealing the ends thereof.

The present invention relates in particular to an apparatus and to a method for producing substantially blockshaped packings or containers filled with a liquid from a continuous tube without prestamping. A material to be packaged such as a liquid is introduced into the tube which is of rectangular cross section and which is positioned centrally between mold elements which are fed centrally from opposite sides and over the tube by a continuous chain conveyor. The mold elements engage the tube from each side and they are moved downwardly, together with the tube. In accordance with the invention means are provided for engaging the walls of the tube and for moving them inwardly as the spacing between two successive mold elements is reduced gradually. The moving means includes a conveyor formed of linked mold cavity half portions which are advanced to engage opposite sides of a centrally located filled tube. The tube and the spaced mold element sets comprising two mold portions in closed engagement around the tube are fed together and the distance between the portions engaged by two adjacent mold sets is gradually shortened as the sides of the tube between the adjacent mold sets are moved inwardly in order to form intermediate sealing flat edges which are thereafter sealed and severed to form separate filled containers.

The invention is an improvement over the prior art, particularly in respect to the improved means for molding the individual container elements from a continuous tube by moving a series of cooperating mold halves into engagement with the tube and for thereafter uniformly shortening the spacing between the mold elements as the sidewalls of the portion of the continuous tube between the mold elements is pushed in to form a sealing edge.

In the preferred arrangement of the invention the apparatus includes two large continuous chain conveyors which carry mold halves at spaced intervals along the length thereof and which include conveyor portions extending in paths on each side of the filled tube so that the mold element of one conveyor system is moved into engagement with an opposite conveyor mold element over the centrally positioned continuous tube length. Between each mold element on each chain conveyor there is located a pivotal folding and sealing bar member. Means are provided along the conveyor length for shortening the distance between successively fed sets of mold elements which engage around the central tube and for simultaneously causing the infeed of the folding bar member to cause the walls of the tube to be moved inwardly to form a flat sealing edge. The length of each container which is formed is determined by the length of the wall of the mold cell of each mold set. The spacing between successive mold elements is such initially that the folding bar member may easily move over the surface of the tubes between adjacent mold sets and gradually fold the walls inwardly as the distance between successive mold sets is gradually shortened between the feed. In order to assure an even infeeding of the folding bar elements as the distances between the mold sets are shortened, linkages are associated with the folding bar element and the connecting sets of mold elements to insure that the shortening of the distance and the infeeding of the molding bar is accomplished gradually and simultaneously. In this manner the containers are formed into exact parallelepipeds.

In a preferred embodiment of the invention, successive mold-forming elements on each chain conveyor are articulated together by means of hinge connecting bars or links which fold inwardly as successive mold elements of the chain conveyors are moved gradually together. Guide means are provided for also moving the folding bars inwardly gradually at the same time as the spacing between mold sets is reduced until only a small space remains between the opposite wall elements of the filled central tube which may thereafter be sealed together and severed. This construction is an improvement over the prior art inasmuch as the hinge pins of the linkage between rectangular trough-shaped cell halves may be arranged outside the folding planes of the tube wall material and thus the feeding of the mold halves and the actuation of the infolding bars may be accomplished in a simple and easy manner.

A further feature of the invention is that the folding members between two cell units or container units which are to be formed include two opposite folding jaws which are articulated through a linkage to the outer ends of the individual cell units of each conveyor system. The end faces of the folding jaws face the central tube and are disposed in a plane intermediate the cell-forming mold elements of the cooperating chain conveyors. The movement of these jaw elements may be controlled such that the distance between opposite faces of each jaw set may be shortened with a corresponding shortening of the distance between adjacent cell units. Although the filled tube is not covered and thus not supported in the construction of the invention during the initial covering of the tube adjacent the end faces of the container material by the mold cell parts, it was found that an absolutely sharp folding with an exact parallelepipedal form can be obtained with such an apparatus because of the internal liquid pressure prevailing in the tube and also because the mold jaw edges are moved during the folding relatively to the tube wall exactly in a circular arc about the associated tube wall as the distance between the moldforming sets of elements is shortened. Since there is no relative movement during the entire molding process between the tube or the container material forming the tube in the mold cell parts, there can be no elongation or buckling. It is particularly advantageous to mount each folding jaw element on an end portion of the mold element using guide rods or links of a length selected equal to half the length of the cell or container being formed. This insures that the distance between associated cell edges or container edges and mold jaws remains constant during the inward movement of the folding jaws. In the preferred arrangement, link members are connected to the folding jaw which form a parallelogram linkage providing a satisfactory translatory movement of the folding jaw to effect the end sealing edge formation.

The jaws are advantageously mounted so that they do not move completely together permitting the liquid material in the tube to remain in communication with adjacent molded container elements which are subsequently sealed by a welding die arranged in the jaw by the actuation of the jaws through pressing elements arranged alongside the conveyors. In addition, a severing blade is mounted in the jaw which is actuated after the welding of the seam between successive container elements or packings is accomplished.

Accordingly it is an object of the invention to provide a device for forming individual container elements from a continuous tube which is filled with a material such as a liquid which includes mold half elements which are fed around opposite sides of the tube and which engage the tube and move it downwardly and with means provided for closing the gap between successive sets of container-forming mold elements as the side of the tube between the adjacent sets is moved inwardly to form a sealing flat edge which is subsequently sealed and severed to form individual container elements.

A further object of the invention is to provide a method of forming individual containers comprising using an elongated tube filled with liquids comprising directing a series of spaced mold sets each formed of two mold elements which are fed together against opposite sides of the tube to engage the tube and to move it downwardly with the mold sets, gradually reducing the spacing between mold sets and simultaneously directing the opposite walls of the tube between adjacent mold sets inwardly to form a flat sealing flap, and thereafter sealing the sealing flap and severing the tube across the flap to separate an individual container element.

A further object of the invention is to provide a container-forming apparatus which includes endless conveyors having a plurality of individual mold half elements arranged at spaced locations therealong with the conveyors arranged such that the mold half elements meet centrally around a filled tube of liquid and with sets of the mold elements spaced sufficiently in order to permit the infolding of the side walls of the tube as the distance between adjacent sets of mold half elements of the two conveyors are moved together, and with further means provided for closing the sidewalls of the tube to form end-sealing flaps and for heat-sealing the flaps and for severing the tube across the flaps to permit separation of individual container elements from the tube.

A further object of the invention is to provide a container-filling, forming and separating device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 4 is a section taken along the line 4—4 of FIG. 2 of a conveyor system having two juxtaposed mold cells which are simultaneously fed around tubes filled with liquid.

Figure 1:
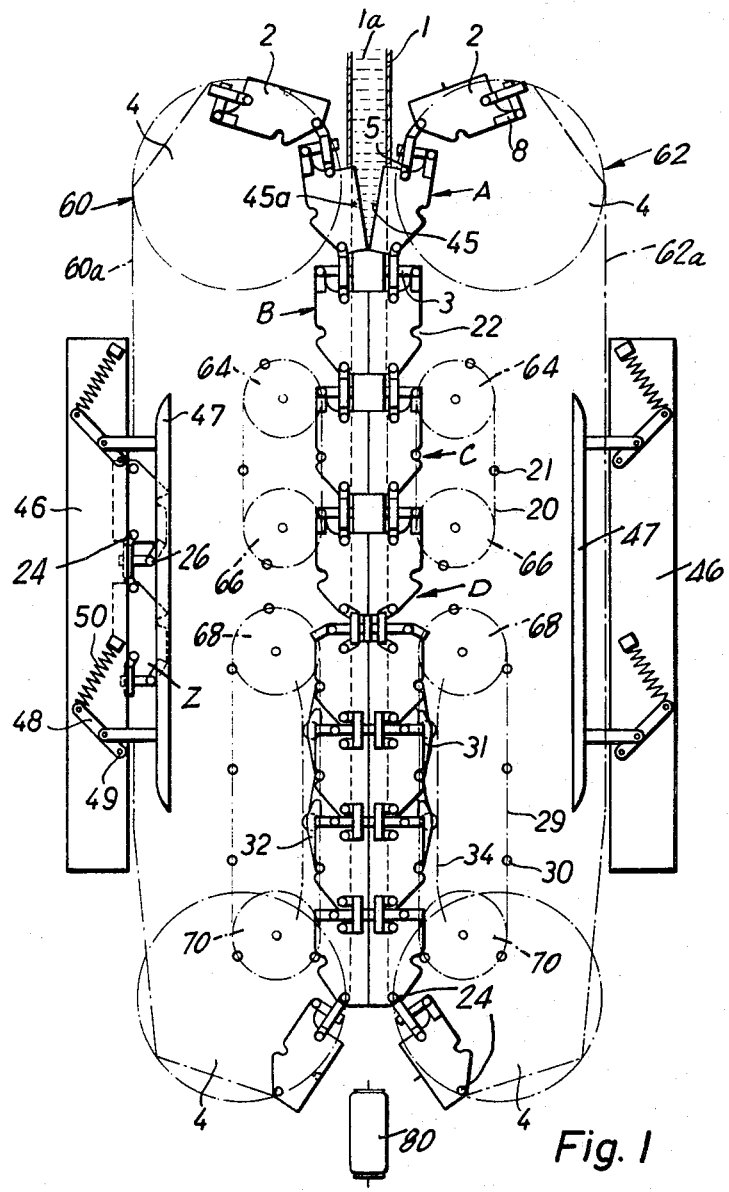
FIG. 1 is a schematic side-elevational view of a device for forming individual liquid-filled containers from a continuous tube filled with liquid constructed in accordance with the invention.

Referring to the drawings in particular, the invention embodied therein as indicated in FIG. 1 includes a device for operating on a tube 1 of a suitable material such as paperboard, cardboard, plastic or metal foil or the like which is filled up to the filling level with a liquid 1a to be packaged into individual containers. In accordance with the invention, tube 1 is located between two sets of conveyors generally designated 60 and 62. The conveyors 60 and 62 each include mold half elements 2 which are pivotally connected on a pivot shaft 7 at fixed spaced locations on endless chains 60a and 62a which are formed of the elements 2 and a connecting linkage and trained to run around reversing wheels or sprockets 4. Each half mold element 2 includes an end face 2a having a trough-shaped cavity or cell face defined therein which is engaged around the tube 1 as the mold elements 2 are moved downwardly on opposite sides of the tube 1 along central reaches of the conveyors 60 and 62.

Figure 2:
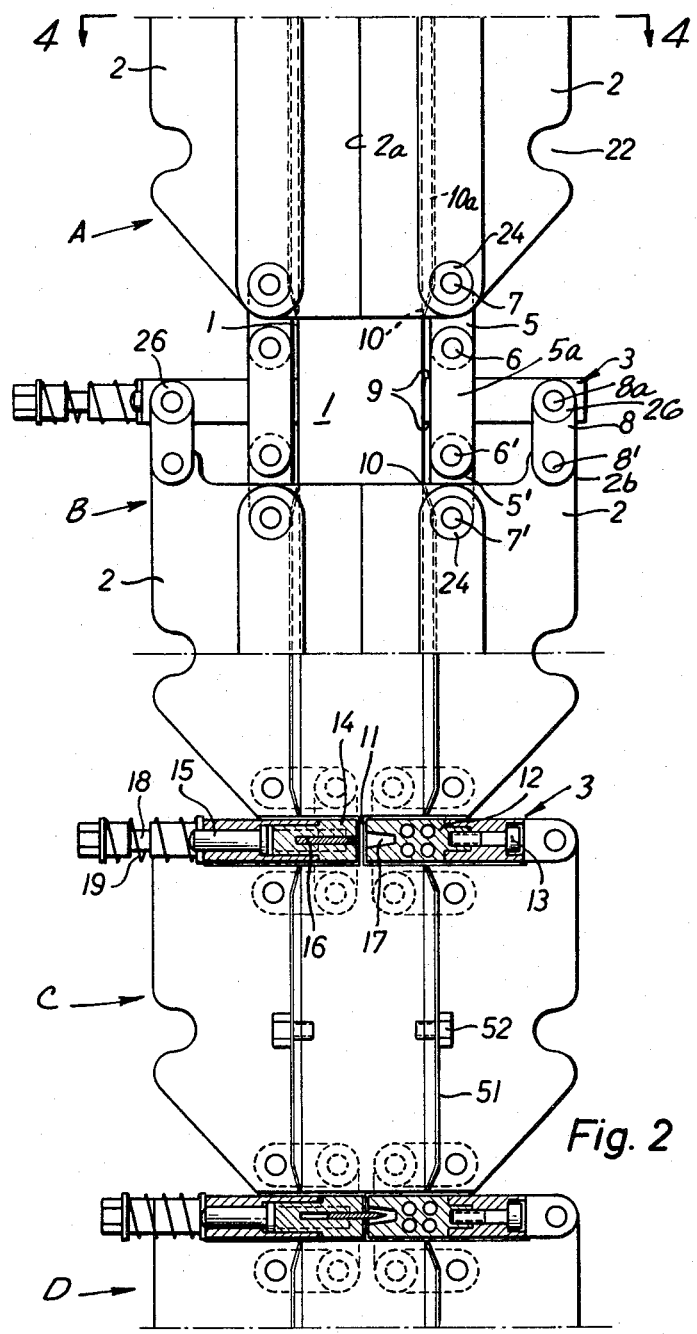
FIG. 2 is an enlarged partial elevational and partial sectional view of a portion of the mechanism indicated in FIG. 1.

As best indicated in FIG. 2, a guide rod or link member 5 is pivotally connected to the hinge shaft 7 and to a similar hinge shaft 6 and to an intermediate guide rod 5a which connects a guide rod 5' hinged to a shaft 7' at the upper end of the next adjacent half mold element 2 of each conveyor. The outer edge of each mold-forming element 2 includes an upper projection 2b on which is pivotally mounted a link member 8 at a pivot pin connection 8'. The outer end of the link member is pivoted at 8a to a combination folding jaw sealing and severing element generally designated 3. The distance between the centers of the hinge shafts 6 and 7, and also the distances between the adjacent hinge shafts 6 and 6', correspond to half the thickness of the container to be formed and half the depth of the mold cell cavity in the mold cell half elements 2. The link element 8 is substantially the same length as the element 5 so that a prallelogram four-link chain is formed by the folding jaw 3, one mold cell half element 2 and the two guide links 5 and 8. Jaw element 3 is supported by the link 5a so that the upper and lower edges indicated 9 of the jaw 3 extend substantially perpendicularly outwardly from the outer surface of the tube 1 when the flat end of the jaw 3 engages the tube. The outer upper and lower edges of the jaw 3 describe circular arcs in respect to the edges 10 of mold cavities 10a of the mold element 2. When the mold sets comprising two mating elements 2 of opposite conveyors are moved together. Such arcs are described as the folding jaw is moved inwardly and the adjacent mold sets generally designated A, B, C, D, etc. in FIG. 2 are moved from the separated position as shown between the mold sets A and B to the closely spaced position indicated between the mold sets B, C and D. The inward movement of the folding jaws 3 is effected by control cams which will be described more fully hereinafter in respect to the showing of FIG. 3.

The feeding movement of the tubt 1 is effected in a downward direction by the movement of the conveyors 60 and 62 to cause each mold half element 2 to engage on respective opposite sides of the tube 1. There is a friction locking, between the mold cell parts of each conveyor and the tube wall, caused by the internal pressure of the fluid in the wall so that no tensile forces are exerted on the tube at the start of the formation of the head and bottom seals which will be effected by the folding jaw mechanism 3. The movement of the molds together and their downward movement and the movement of adjacent mold sets A and B, etc., gradually together is controlled so that there will be no undesired stresses on the tube material. The tube material will hug the interior of the mold parts in any position of the mold parts 2 so that an extremely sharp folding is obtained while still protecting the tube material. It has been found that the fact that the upper end of the tube is unsupported between the cell halves 2 and the mold jaws 3 upon initial engagement of the mold elements 2, 2 at the upper ends of the conveyors has no effects on the tube material even when thin tubing material is employed.

When the jaws 3 are moved inwardly to the closed position which will be accomplished when the link 5a is moved parallelly inwardly and the links 5 and 5' are oriented substantially horizontally, as indicated in dotted lines at the positions between B and C and C and D, there will be a small gap 11 between the mold jaws and the material of the tube 1. This makes it possible for the liquid to escape from the container which is being formed in the lower mold set C to escape upwardly into the upper mold set B to insure an exact shaping of the size of the container to be formed and the exact filling or dosing thereof. The gap 11 is closed during the production of the cross seams by sealing means which are arranged in the jaws 3. One of the jaws 3 includes a welding counter die 12 which is substantially fixed or which can be adjusted by an adjusting screw 13. In the opposite folding jaw 3 there is arranged a folding die 14 which is moved outwardly by means of plunger 15 in the direction of counter die 12 when the mold set C is moved downwardly to the position indicated by mold set D. The inward movement of the die 14 toward the counter die 12 serves to close the free gap 11 and to apply the necessary welding pressure.

In the moving die 14 there is also provided a severing plate or knife 16 which provides means for cutting away the container, after it has been completely sealed, from the remaining portion of the tube 1. Means are provided to actuate the cutting blade 16 to cause it to move outwardly into the recess 17 provided in the opposite fixed welding die 12. Normally the severing plate 16 is held in a retracted position by a spring 19 surrounding an operating pin 18. The pin 18 is operated by means of a stationary cam device arranged in the path of the conveyor which will be described more fully hereinafter.

As indicated in FIG. 1, when the cell halves 2, 2 meet in the range of the upper wheels 4, they combine to form a mold cell or set and the halves 2 are fixed together by a cam 45 of one mold element 2 which engages in a corresponding recess 45a in the other mold element 2.

Figure 3:
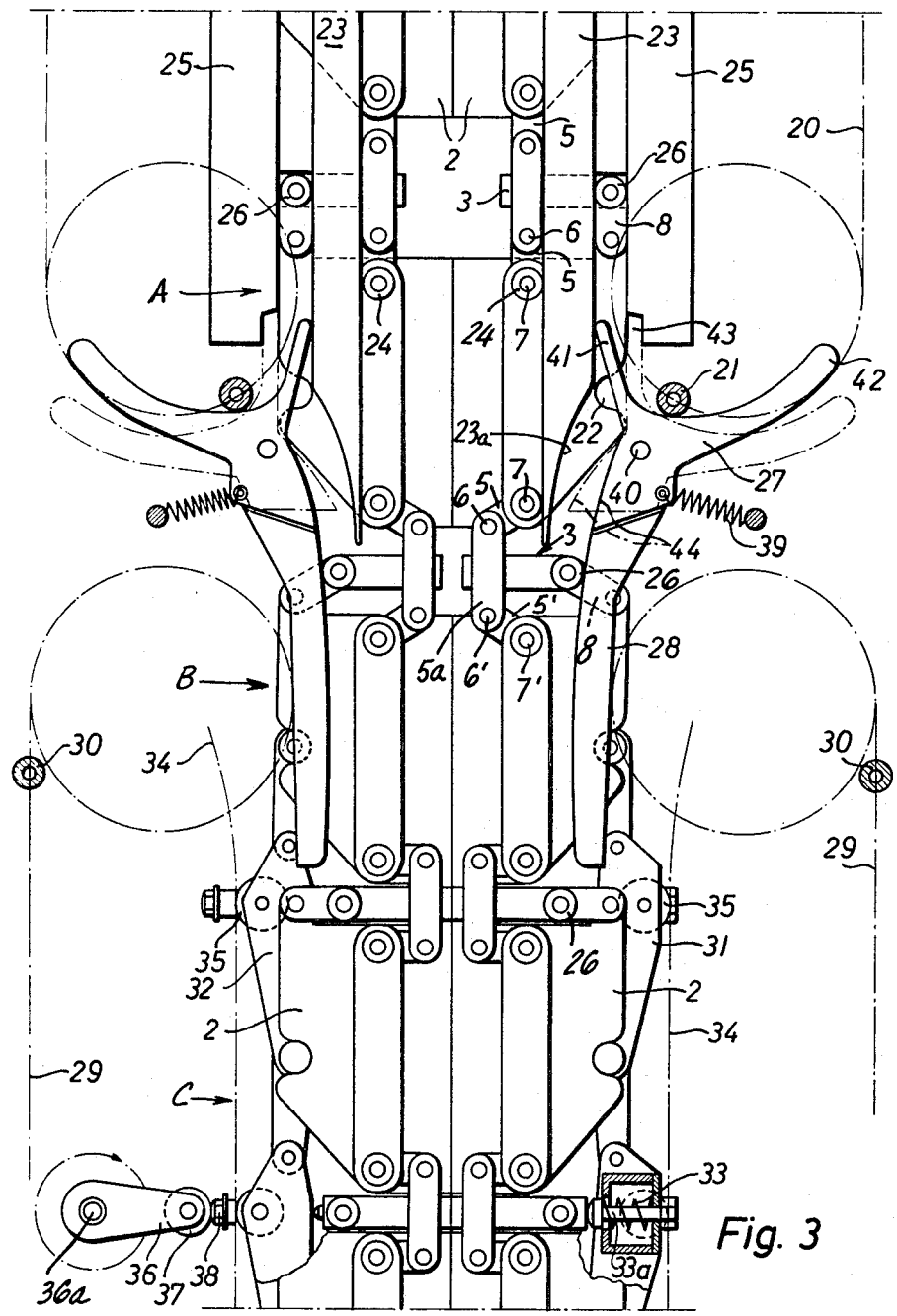
FIG. 3 is a view similar to FIG. 2 but of another portion of the mechanism indicating the control elements for effecting the in-folding of the tube wall portions as the mold sets are moved gradually together.

The feed for the mold elements 2 which are contained on the chains 60a and 52a of the conveyors 60 and 62 may be solely by means of the action of driving conveyor chains 20 which are trained over spaced vertical wheels 64 and 66 arranged on each side of the upper portion of the central reaches of the conveyors 60 and 62. One of the wheels 64 or 66 of each set is advantageously connected to means such as a motor (not shown) for effecting the movement of the chain 20 and the rotation of the wheel 64 and 66. The chain 20 carries follower rollers 21 at fixed spaced locations arranged so that they will enter into recesses 22 formed on a side of each of the mold elements 2 and advance the mold element downwardly together with the tube 1. As best indicated in FIG. 3, guide bars 23 extend downwardly on each side of the central reaches of the conveyors 60 and 62 and form outer guiding elements for rollers 24 which are rotatably mounted on the hinge shaft 7. In addition, stationary guide elements or rods 25 extend downwardly from a spaced location outside each respective rod 23 to form outer guiding limits for rollers 26 which are carried on the folding jaws 3. As can be seen in FIG. 3, the lower ends 23a of the rod guide elements are curved from the outside toward the inside to permit the roller 26 to move inwardly at this location. The rollers 26 move under a switching member 27 at the lower end of the channel formed between the rods 23 and 25 and ride on the surface 44 of the member 27 and then over a control cam element 28 so that they are moved, together with the jaws 3, inwardly.

A second set of driving chains 29 is mounted on sprocket members 68 and 70, one of which is driven by a motor (not shown), (see FIGS. 1 and 3). A plurality of followers 30 is carried at spaced intervals on the chains 29 which move downwardly alongside each of the sides of the mold parts 2, 2 and the followers 30 engage into the associated recesses 22 and drive the combined mold parts or sets downwardly at a speed which is less than the speed of the first driving chain 20, with the reduction in speed corresponding to the reduction of the length of the mold cell units caused by the in-folding of the sidewalls by the jaws 3. The chains 29 also each carry a pressure element 31 and 32, respectively, for actuating the elements of the folding jaws 3. The pressure element 31 is associated with the fixed welding die 12 having a plunger 33a which is actuated through a spring 33 and which provides the welding pressure. The pressure elements 31 and 32 are provided with rollers 35 which are guided along guide elements 34 and are directed inwardly under pressure against the folding jaws 3 to effect the sealing of the infolded material of the tube 1. The pressure element 32 acts on the moving welding die 14 through the thrust bolt 15 to close the initially opened gap 11, as indicated in FIG. 2, and to apply the welding pressure. The plungers 33a indicated in FIG. 3 act directly on the folding jaws 3 having the fixed welding dies 12.

The operating pin 18 of the severing blade 16, as indicated in FIG. 2, must be actuated during the movement of the chain 29, and this is effected by a rotating lever 36 which is rotatably mounted at a fixed location on a shaft 36a and carries a roller 37 which engages a head 38 of the pin 18. The operating head of the pin 18 is so rounded off and the lever arm 36 is so dimensioned that the roller 37 strikes the rounded head 38 in a starting position substantially centrically, and in the severing state acts exactly centrically, so that no marked transverse stresses act on the operating pin 18.

The first guiding chains 20 were selected for constructional reasons so that the followers 21 of the latter run in a path intercepting the center of the path of movement of the guide rollers 26 of the folding jaws 3. The switch 27 is arranged at the lower end of the path of the roller 26 confined between the plates 23 and 25 and it is urged by a tension spring 39 to rotate about a fixed pivot 40 into a position such that the tongue 41 of the switch 27 leaves the passage between the stationary guide 25 and the inner guide 23 during the passage of the roller 2. The switch 27 includes an operating arm portion 42 which is moved by each passing follower 21 so that the tongue 41 enters the recess 43 of the guide plate 25 to clear the passage between the plate 25 and the plate 23 for each roller 26. The passage is blocked, however, until the previous guide roller 26 of the mold elements 2 has passed this point. The respective roller 26 then moves against a shoulder 44 which acts to move the switch into the position shown in FIG. 3 and also provides a curved surface over which the roller 26 moves until it hits the control surface 28. The control cam 28 has a curvature adapted to the reduction of the velocity of the cell element 2 as it is moved downwardly toward the next lowermost cell element between the positions A and B, as indicated in FIG. 3.

In some instances it is desirable to eliminate the switches 27, 27 in which case the driving chains extend downwardly between the zones A and B and are provided with recesses for engaging follower pins on the associated mold element parts 2.

In the embodiment illustrated and particularly shown in FIG. 3, it is impossible in the range between the driving chains 29 and 20 to effect incorrect folding of the tube 1 between the mold cell elements 2. This is so because of the connecting linkages 5, 5a and 5' and the linkages supporting the folding arms 3 which provide for the proper shortening of the space between adjacent mold element assemblies as the assembly in the position A in FIG. 3 is moved downwardly while the assembly indicated at B is fed at a lower speed by the chain 29. The cell elements 2, 2 are held together by the guide rollers 24, 24 which ride against the guide rod elements 23, 23 and the movement of the jaws 3 is controlled by the movement of the rollers 26 which begins to move inwardly to engage the wall of the tube 1 during the transition of the assemblies from the position A to the position B.

A tensioning device is provided for the chains 60a and 62a, as indicated in FIG. 1, for insuring a constant tensioning of the chains even after they have been worn. Each tensioning station includes a fixed guide 46 against which the rollers 24 of the cell half elements 2 bear. An elongated member 47 is articulated approximately in the center of levers 48 which are pivoted on the fixed guide 46 at pivot points 49. A tensioning spring 50 engages each free end of the levers 48. Passage of the mold sets 2, 2 over the fixed guide 46 causes the folding jaws to be forced to the outside and the guide rods 5 are turned until a sufficient tension has been obtained between the chains connecting the cell elements. The movable guide 47 acts on the rollers 26 to return the jaws to their proper orientation or to a position at which they can be moved by the conveyors on each side of the tube 1 without indenting the wall of the tube 1 initially. The arrangement and dimensioning of the guide rods 48 and the springs 50 is such that the axial load of the cell chain remains substantially constant independent of the stroke of the moving guide 47.

In the starting position of the guide rods 5, as indicated in the upper portion of FIG. 1, the axial force component in the cell chain drops with constant normal force by a continued inward movement of the folding jaws 3. The moving guide 47 is therefore so articulated on the levers 48, that the forces exerted on the guide rollers 26 of the jaws 3 are increased with increasing approach of the elastic support. This is true because a substantially constant torque is exerted on the levers 48 even during relaxation of the springs 50 due to the increase of the active lever arm on the springs 50 in the particular arrangement. Thus, with a reduction of the active lever arm length acting on the moving guide 47 as a result of further deflection of the levers 48, the force exerted on the moving guide 47 is increased correspondingly. The axial force component in the chain between the elements 2 also remains substantially constant, independent of the degree of tension.

In the cross sectional representation the apparatus shown in FIG. 4 advantageously includes a double mold set for operating on two tubes simultaneously. The arrangement of course can be formed with two, or one, or more cell elements 2, 2 arranged side by side, as indicated. In the embodiment of FIG. 4, the side walls are made slightly convex in order to produce easy to grasp containers. For this purpose elastic sheets 51 are bent outwardly at the top and the bottom and may be adjusted by adjusting screws 52. The screws are advantageously made with indicia, so that the cells can be calibrated.

It is preferable to drive the lower set of wheels 4 of the conveyors 60 and 62 in order to permit the cell halves 2 to be detached uniformly at the lower end of the device in order to permit the separation of the completed container 80 (FIG. 1). The second driving chains 29 need not be driven but can be designed as break chains so that they provide a drag on the movement of the cell assemblies, thus providing the same shape-giving or shape-holding effect.

While specific embodiments of the invention have been shown and described in detail to illustrate the application of the inventive principles, it will be understood that the invention may be embodied otherwise without departing from such principles.

What is claimed is:

1. A device for forming individual sealed containers from a tube filled with a material to be packaged, comprising a plurality of sets of mold elements, each set including a part element adapted to be arranged on opposite sides of a tube which is filled with material to be packaged and to frictionally engage around a portion of the tube, means interconnecting said mold sets permitting spacing of said mold sets apart, jaw means carried by each of said sets including first and second jaws movable from opposite sides toward and away from the tube located between the part elements, first means operatively associated with said mold element sets for moving said part elements together to frictionally engage the tube, and second means operatively associated with said mold sets for moving adjacent mold sets together with each frictionally holding its associated portion of the tube without movement and for simultaneously moving said first and second jaws to engage the tube between the portions engaged by adjacent sets of mold elements and from opposite sides and to frictionally hold said sides without relative movement and to deflect the opposite walls inwardly to form a flattened cross strip of said tube between successively adjacent sets of mold elements and to cause the wall portions between the portions held by said jaws to form flattened ends as the jaws hold the tube without tube movement relative to the jaws, and means associated with said jaw means for sealing the opposite walls of the tube at the cross strip and severing them across the strip to separate a filled container from the tube.

2. A device according to claim 1, wherein said means interconnecting said mold sets permitting spacing of said mold sets apart includes pivotal link members which form with said mold part elements two separate endless chains, means mounting said endless chains with central reaches extending substantially vertically at a spacing from each other such that said mold part elements of each conveyor are presented on each side of a tube positioned therebetween for movement into engagement therewith.

3. A device according to claim 1, wherein said first means for moving said part elements together includes means for driving said chains formed by said links and said mold part elements.

4. A device according to claim 1, wherein said first means for moving said part elements together to engage the tube include conveyor means for directing said part elements through paths on opposite sides of the tube which extend parallel to the tube and provide for a movement of said part elements together into engagement around the tube.

5. A device according to claim 1, wherein said means interconnecting said mold sets includes a plurality of links pivotally connected together and to respective adjacent part elements, said means for moving said part elements together include means for feeding sets of mold elements which have already engaged around a length of the tube at a slower speed than the ones which engage the tube at a later time in order to permit the ones which engage the tube at a later time to overtake the oher elemens and to be moved in a direction toward the previously fed element.

6. A device according to claim 5, wherein said first and second jaws are pivotally connected to respective opposite part elements of a mold set and are linked between adjacent sets of mold elements, said sets being movable toward and away from each other by pivotal movement of said linkage, inward movement of one set toward the other set causing inward movement of said first and second jaws to deflect opposite walls of the tube inwardly.

7. A device according to claim 6, wherein said first and second jaws are pivotally mounted on link elements pivotally connected to outer ends of each respective part element of said mold sets, said mold sets being interconnected by linkages which include short pivotal link members pivotally connected directly to each end of said link sets and a connecting linkage connected between said short linkages of adjacent sets and connected to said jaws.

8. A device according to claim 1, wherein said second means for moving adjacent mold sets together and for simultaneously moving said first and second jaws together include a parallel linkage connecting said respective jaws and respective adjacent mold part elements, and means located along the path of movement of said mold sets for deflecting said jaws inwardly and simultaneously moving said mold sets together.

9. A device according to claim 8, including a guiding channel defined along a path of movement of said mold sets when they are moved together, said first and second jaws each including a roller element confined in a guide channel, said guide channel including a portion permitting inward movement of said roller elements to cause inward movement of said first and second jaws.

10. A device according to claim 9, including a movable conveyor, said movable conveyor forming said second means for moving adjacent mold sets together and including a member engageable with each of said mold sets from opposite sides thereof for moving said mold set along a predetermined feed path, and means for guiding said mold sets for movement toward said conveyor permitting movement at a faster speed than by movement with said conveyor, and switch means between said guide means and said conveyor for regulating the feed of said guide means to said conveyor.

11. A device according to claim 1, wherein said means interconnecting said mold sets include pivotal link members, said mold sets with said pivotal link members being formed into endless chains, guiding wheel means for guiding movement of said endless chains, said guiding means being arranged to permit downward movement of opposite associated part elements of said mold sets through a path parallel to the axis of the tube which is filled, said mold sets being movable together on each side of said tube as they are moved alongside said tube to frictionally engage the tube, said mold part elements engaging the tube at spaced locations along the length thereof, means disposed along the length of the path of movement of said endless chain in a direction parallel to the tube axis to cause inward feeding of said first and second jaw members to engage said tube from opposite sides and to deflect said walls inwardly, and including a movable conveyor having means engageable with said mold sets for advancing said mold sets at a slower speed to permit inward movement of said adjacent mold sets toward each other and the simultaneous inward movement of said first and second jaws, pressure means disposed along the path of said second conveyor to cause pressing of said jaw members together to effect sealing of the tube between the parts engaged by adjacent mold sets, and actuating means disposed along the path of movement of said movable conveyor for severing the sealed portion of the tube between adjacent mold sets to form individual container elements.

12. A device according to claim 11, wherein said press means includes a press member carried by said conveyor, and guide means for guiding said press member into pressing engagement with said first and second jaws.

13. A device according to claim 11, wherein said means for severing the tube include a rotatable cam actuating member rotatably mounted adjacent said second conveyor and movable to engage said jaws, said jaws including a knife member mounted in one of said first and second jaws and a recess defined in an opposite jaw, said knife being movable into the recess to sever the material between the jaws when actuated by said actuating member.

14. A device according to claim 11, including means for spacing said mold elements apart as said endless chain is advanced and prior to the mold parts being presented on each side of the tube.

15. A device according to claim 11, including means for separating said first and second jaws prior to the mold parts being presented on opposite sides of the tube.

16. A device according to claim 11, including a stationary guide member, said mold part having a roller adapted to ride along a guide member, and resilient means disposed in the path of movement of said jaws for deflecting said jaws with the associated linkage for proper positioning of said mold part elements in respect to each other and for proper positioning of said first and second jaws.

17. A device according to claim 1, wherein said mold sets include two part elements forming two cooperative mold cavities when interengaged for engaging around two separate tubes filled with the material to be packaged.

18. A device according to claim 1, wherein said means interconnecting said mold sets include first and second small link elements pivotally connected to the top and bottom of adjacent mold part elements, an intermediate link member pivotally connected to the outer ends of said first and second members, a jaw member connected to said link member, and a link member pivotally connected to the outer end of said mold part element and to said jaw member, said jaw member being mounted with said link member in the form of a parallelogram linkage to permit inward movement of adjacent sets of said molds and simultaneous inward movement of said jaws.

19. A device according to claim 18, wherein said link carrying said jaw is of a size such that said jaws will be spaced apart slightly when they are in opposed relationship prior to the sealing of the material therebetween so that the material filled in the tube may communicate between one mold set and the other prior to sealing.

20. A device according to claim 1, wherein one of said first and second jaws includes a heat sealing die, the upper of said jaws including a movable die and means for moving said movable die toward said heat-sealing die to effect sealing of the container.

21. A device according to claim 1, including a knife carrying said movable die, means mounting said knife for displacement in said movable die into and out of a recess defined in said fixed die.

22. A device according to claim 1, wherein each of said mold part elements includes a recess defined on the outer periphery thereof, said moving conveyor including a member engageable in said recess for advancing said mold sets.

23. A device according to claim 1, wherein means are provided for driving said endless chain.

24. A device according to claim 1, wherein said mold part elements define a mold part cell, said cell being slightly convex.

25. A device according to claim 24, wherein said mold part elements include adjustable walls for adjusting to compensate for manufacturing tolerances and differences in thickness of the packing material.

26. A device according to claim 25, including means for adjusting the walls of said mold part elements.

27. A method of forming individual parallelepiped containers using an elongated tube filled with liquids comprising directing a series of spaced mold sets each formed of two mold elements which are fed together against opposite sides of the tube to engage and frictionally hold the tube and to move it downwardly with the mold sets, engaging the opposite sides of the tube between spaced mold sets by means disposed parallel to the tube walls, gradually reducing the spacing between mold sets and simultaneously directing the opposite walls of the tube between adjacent mold sets by moving the engaging means inwardly while the area of engagement is maintained in the original engaging plane parallel to the tube wall before it is formed to form a central flat sealing flap and flattened end walls, and thereafter sealing the sealing flap and severing the tube across the flap to separate an individual container element.

28. An apparatus for the production of block packings filled with a fluid filling material from a continuous tube without prestamping, comprising a tube filled with a material to be packaged and having a rectangular cross section, a plurality of sets of mold elements, each set including a mold element movable along said tube from opposite sides, with two mold elements of each set movable together to frictionally engage around a respective portion of the tube, means to cause two sets of mold elements to engage said tube at spaced locations and to frictionally hold said tube as the two elements are gradually moved together, means guiding the movement of said mold sets together to insure that the adhesion limit of the tube material is not exceeded during the progressive feeding together of the mold sets, folding jaws arranged on each side of said tube between said mold sets, said folding jaws being characterized in that their end faces extend substantially parallel to the plane of the mold set halves and to the tube wall and comprise two opposite folding jaw elements, means for moving said jaw elements toward each other when said mold sets are moved together and to maintain their end faces in the original engaging plane parallel to the tube before it is formed, said jaws being movable to form said tube into a block-shaped pack with flat end faces at substantially right angles to the tube axis and a flat sealing area parallel to the tube axis located between adjacent packs, said jaws being movable toward each other in a translatory movement in the course of their feed with a corresponding reduction of the distance between two adjacent pack units until the surfaces of the pack units adjoining the end faces of the mold elements are disposed at right angles and wherein the distance between associated pack outer edges and the jaw element edges remains constant during the forming.

29. An apparatus according to claim 28, including link means connecting said folding jaws to said adjacent mold sets for articulated movement inwardly to engage the wall of said packing, said link means being of a length equal to half the thickness of the packing.

30. An apparatus according to claim 29, including an additional guide rod of the same length as said link means provided between each folding jaw element and the adjacent mold element and forming a parallelogram linkage connected to said link means, said folding jaw and a respective mold element.

31. An apparatus for producing parallelepiped packs filled with fluid material from a continuous flexible tube filled to a predetermined level with a fluid material and without any preliminary compression of the tube in the region of the transverse edges of the packs to be formed, said apparatus comprising, in combination, a pair of endless chains, each having one run extending in spaced, parallel and facing relation to a run of the other; each of said chains comprising articulated mold elements arranged to completely enclose and frictionally engage the flexible tube peripherally and to deform it to a rectangular cross section; each mold element having a length equal to the preselected length of the packs to be formed; articulated jaw members interconnecting said mold elements and arranged to be moved inwardly from opposite sides toward the tube during advance of the tube portions by the closing together of adjacent mold elements, to form, with associated mold elements, a casing completely enclosing a section of a tube having a parallelepiped form, to subdivide the tube into a plurality of interconnected shaped and encased packs of exact parallelepiped form; said jaw members having end surfaces parallel to the tube and being movable toward each other with the end surfaces remaining in the same plane, and means on said jaw member effective to form transverse seals between adjacent packs.

32. A device according to claim 1, wherein said seal containers are formed into exact parallelepiped elements.

References Cited

UNITED STATES PATENTS

| | | | |
|---|---|---|---|
| 3,001,348 | 9/1961 | Rado | 53—182 |
| 3,122,467 | 2/1964 | Hannon | 53—180 X |
| 3,300,944 | 1/1967 | Thesing | 53—28 |
| 3,347,015 | 10/1967 | Nutting et al. | 53—373 X |

FOREIGN PATENTS

| | | |
|---|---|---|
| 1,368,859 | 6/1964 | France. |
| 1,124,865 | 3/1962 | Germany. |

WILLIAM W. DYER, JR., *Primary Examiner.*

ROBERT L. FARRIS, *Assistant Examiner.*